May 16, 1933.     V. A. TINELLO     1,908,933
FILTER
Filed Oct. 2, 1931

Witness
H. Woodard

Inventor
Vito A. Tinello
By H. B. Willson &co
Attorneys.

Patented May 16, 1933

1,908,933

UNITED STATES PATENT OFFICE

VITO ANTONIO TINELLO, OF UTICA, NEW YORK

FILTER

Application filed October 2, 1931. Serial No. 566,529.

The invention aims to provide an exceptionally simple and inexpensive, yet an efficient filter for water or other liquids, said filter embodying an improved filtering unit which is bodily removable from the filter casing so that it may be readily replaced with a new unit.

The filtering unit embodies a perforated metal dome and a covering of chamois or other flexible filtering material over said dome, and a further object is to provide unique means for unitarily connecting said covering and dome with each other and for insuring tight clamping thereof when the unit is applied to the filter casing.

With the foregoing in view, the invention resides in the novel subject matter hereinafter described and claimed, description being accomplished by reference to the accompanying drawing.

Figure 1:
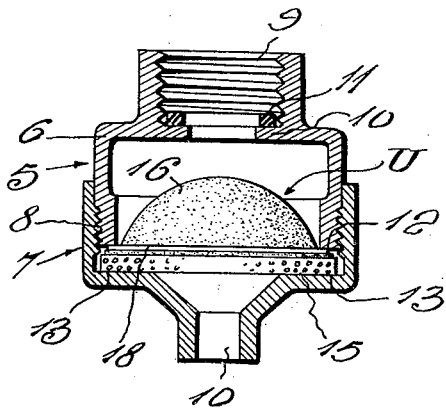
Fig. 1 is a vertical sectional view partly in elevation.

A casing 5 preferably formed of metal, is constructed of two sections 6 and 7 preferably threaded together at 8, the section 6 having a liquid inlet 9 and the section 7 being provided with an outlet 10. In the present showing, the inlet 9 is internally threaded for engagement with the threaded outlet of a faucet, but other provision could be made for connecting the casing with the line or the like which supplies the liquid to be filtered. When the inlet 9 is threaded, as herein shown, the casing 5 preferably embodies a shoulder 10 upon which a conventional gasket 11 bears to obtain a fluid-tight engagement between the faucet or the like and the casing. The lower edge of the casing section 6 constitutes a downwardly facing shoulder 12, and the portion 13 of the bottom of the casing, forms another shoulder. Between these two shoulders, the peripheral portion of a filtering unit U, is tightly clamped.

Figure 2:
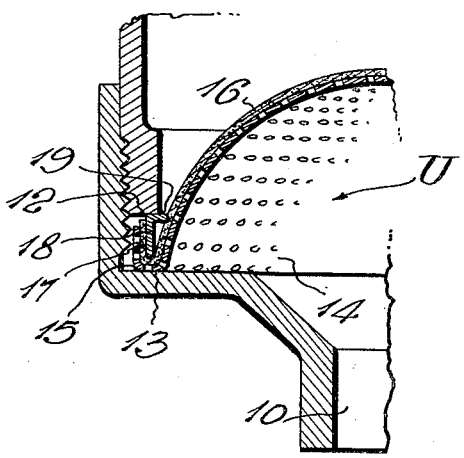
Fig. 2 is an enlarged detail vertical sectional view.
Figure 3:
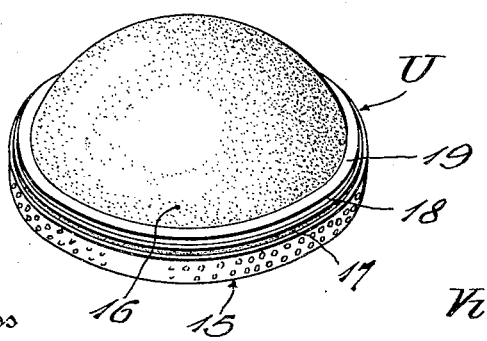
Fig. 3 is a perspective view of the filtering unit.

The unit U embodies a perforated metal dome 14 whose peripheral edge is turned upwardly substantially upon itself to provide a continuous trough 15 around the base of the dome. A covering 16 of chamois or other appropriate flexible filtering material, extends over the dome 14 and has its peripheral edge turned upwardly substantially upon itself to provide a second continuous trough 17 which is frictionally seated in the trough 15. A vertically widened, metal, wedge ring 18 is frictionally held in the trough 17 and holds the latter frictionally in the trough 15, said ring 18 being preferably of the inverted L-shape shown in Fig. 2, with its horizontally extending flange 19 presented inwardly for contact with the covering 16.

The peripheral portion of the unit U is tightly clamped between the shoulders 12 and 13, the bottom of the trough 15 being in contact with the shoulder 13, while the upper free edge of the wedge ring 18 is in contact with the shoulder 12. Hence, tightening of the casing section 7 upon the section 6, will cause tight clamping of the filtering unit U. Whenever this unit must be removed, this can be easily accomplished simply by unthreading the casing section 7 from the section 6, and a new unit with its component parts 14, 15, 16, 17 and 18 pre-assembled, may be quickly and easily substituted for the removed unit. Due to the friction existing between the wedge ring 18 and the trough 17 and the consequent friction existing between said trough 17 and the trough 15, the dome 14, covering 16 and wedge ring 18, remain properly assembled from the time initial assembly takes place at the factory, until they are clamped in place within the casing 5.

Excellent results are obtainable from the details disclosed and they are therefore preferably followed. However, within the scope of the invention as claimed, variations may be made. For instance, while the perforated member 14 is preferably in the form of a dome with the peripheral trough at its base, it might be of substantially flat form with the trough at its periphery, in which case, the covering 16 would also be substantially flat but would be provided with a peripheral trough anchored in the first named trough by a wedge ring, as above explained.

I claim:—

1. A filtering unit comprising a perforated metal dome having its peripheral edge turned substantially upon itself to provide a relatively deep and narrow continuous trough around the base of the dome, a covering of flexible filtering material over said dome and having its peripheral edge turned substantially upon itself to provide a second relatively deep and narrow continuous trough within the first named trough, the outer side walls of the two troughs being cylindrical and disposed in contact with each other, and a continuous ring wedged in said second trough, said ring having a cylindrical outer side lying against said cylindrical side wall of said second trough and holding this side wall tightly against said outer side wall of the first named trough.

2. A filtering unit comprising a perforated metal dome having its peripheral edge turned substantially upon itself to provide a relatively deep and narrow continuous trough around the base of the dome, a covering of flexible filtering material over said dome and having its peripheral edge turned substantially upon itself to provide a second relatively deep and narrow continuous trough within the first named trough, the outer side walls of the two troughs being cylindrical and in contact with each other, and a continuous ring wedged in said second trough, said ring being of L-shape in transverse section and having a relatively wide side wall and a relatively narrow flange projecting inwardly from one edge of said side wall, said relatively wide side wall being of cylindrical form and lying against said cylindrical side wall of said second trough to hold this side wall tightly against said outer side wall of the first named trough, said flange having its free edge disposed tightly against said covering, said cylindrical side wall of the ring having its free edge disposed in the lower extremity of the second named trough.

In testimony whereof I affix my signature.
VITO ANTONIO TINELLO.